US 6,882,657 B1
(12) United States Patent
Werner et al.

(10) Patent No.: US 6,882,657 B1
(45) Date of Patent: Apr. 19, 2005

(54) METHOD FOR DIGITALLY TRANSMITTING DATA WITH A VARIABLE BANDWIDTH

(75) Inventors: Thomas Werner, München (DE); Claudia Schierbling, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/600,910
(22) PCT Filed: Jan. 22, 1999
(86) PCT No.: PCT/DE99/00159
§ 371 (c)(1),
(2), (4) Date: Sep. 26, 2000
(87) PCT Pub. No.: WO99/38289
PCT Pub. Date: Jul. 29, 1999

(30) Foreign Application Priority Data

Jan. 23, 1998 (DE) .......................... 198 02 600

(51) Int. Cl.[7] ................................ H04J 3/16
(52) U.S. Cl. .......................... 370/437; 370/467
(58) Field of Search .............. 370/437, 465, 370/466, 467, 352, 401, 468, 503

(56) References Cited

U.S. PATENT DOCUMENTS

| 5,557,612 | A |   | 9/1996  | Bingham              |         |
|-----------|---|---|---------|----------------------|---------|
| 5,594,491 | A | * | 1/1997  | Hodge et al.         | 725/103 |
| 5,644,573 | A |   | 7/1997  | Bingham et al.       |         |
| 5,987,430 | A | * | 11/1999 | Van Horne et al.     | 705/34  |
| 6,101,182 | A | * | 8/2000  | Sistanizadeh et al.  | 370/352 |
| 6,240,091 | B1| * | 5/2001  | Ginzboorg et al.     | 370/401 |
| 6,359,881 | B1| * | 3/2002  | Gerszberg et al.     | 370/354 |

FOREIGN PATENT DOCUMENTS

| EP | 0 806 852 A2 | 11/1997 |
| WO | WO 96/37069  | 11/1996 |
| WO | WO 97/16034  | 5/1997  |
| WO | WO 97/36429  | 10/1997 |

OTHER PUBLICATIONS

ITU–T Telecommunication Standardization Sector of ITU, ITU: "ITU–T Recommendation M.3010", 10/92.
Peter S. Chow and John M. Cioffi, "A Multi–drop In–house ADSL Distribution Network", 1994, pp. 456–460.
DAle Veeneman and Robert, "ADSL for Video and Data Services", 1995, pp. 837–841.

* cited by examiner

Primary Examiner—Man U. Phan
Assistant Examiner—Toan Nguyen
(74) Attorney, Agent, or Firm—Young & Thompson

(57) ABSTRACT

A method for digital data transmission with a variable bandwidth which can be used in a network which has at least one server, a user terminal and a network management system. A connection is established between the user terminal and the server via an ADSL connection. Bandwidth selection data are transmitted from the user terminal to the network management system. Information data are then transmitted from the server to the user terminal via the ADSL connection. The bandwidth selection data may be transmitted via the EOC channel of the ADSL connection. The network management system transmits billing data to a billing device in a manner dependent on the previously transmitted bandwidth selection data.

3 Claims, 3 Drawing Sheets

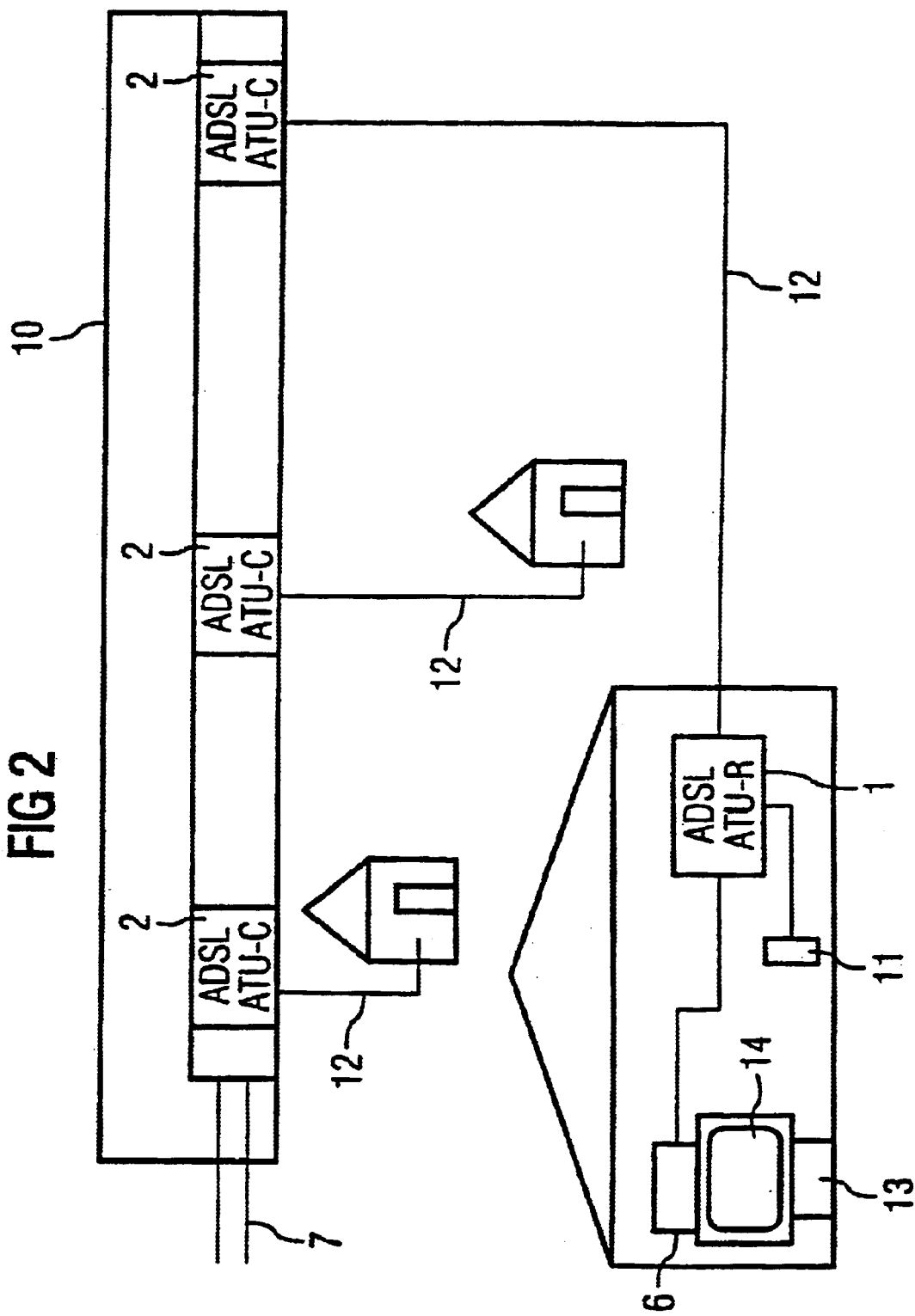

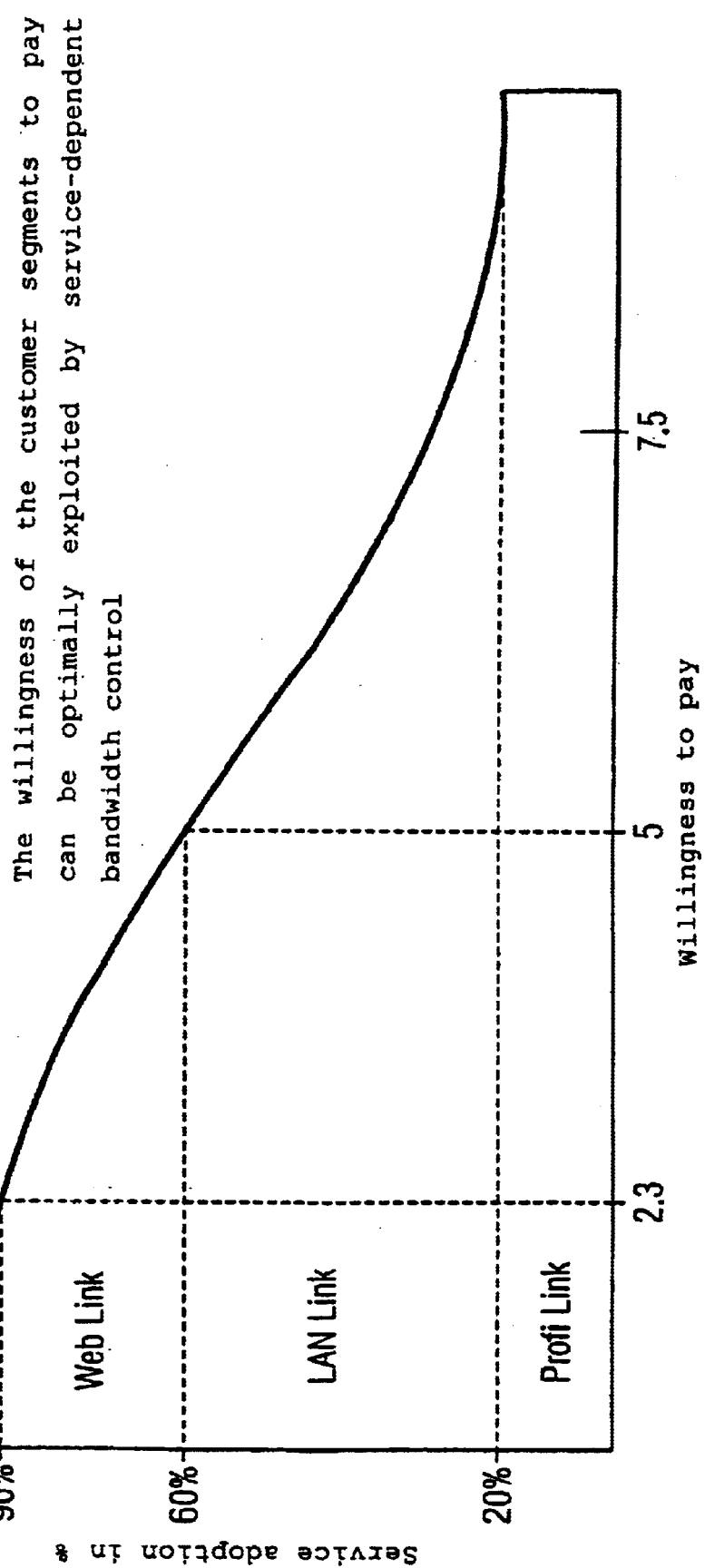

METHOD FOR DIGITALLY TRANSMITTING DATA WITH A VARIABLE BANDWIDTH

BACKGROUND OF THE INVENTION

The present invention relates to a method for digital data transmission with a variable bandwidth in a network which has at least one server, a user terminal and a so-called network management system (TMN), the method enabling flexible service-dependent bandwidth control.

The invention uses the so-called ADSL (Asymmetric Digital Subscriber Line) system, which has recently become more and more widespread. The ADSL system is described for example in the documents by Veeneman, Olshansky, GTE Laboratories Incorporated, "ADSL for Video and Data Services", IEEE Communications Conference, 1995, pages 837–841; or Chow, Cioffi, Amati Communications Corporation, "A Multi-drop ADSL Distribution Network", IEEE Communications Conference, 1994, pages 456–460.

In this asymmetric transmission system, the data stream from a user terminal to a server is significantly smaller than the opposite data stream, that is to say the data stream from the server to the user terminal. Typically, the data stream from the user terminal to the server amounts to a few kilobits per second, whereas the data stream from the server to the user terminals may amount to one or more megabits per second (for example 6 megabits/s in the case of standard telephone lines). The upper limit is prescribed in this case by the line conditions. ADSL is therefore particularly suitable for so-called video on demand or WWW applications, in which generally the data to be transmitted from the user terminal to a server are significantly fewer than in the opposite direction.

ADSL uses a modulation scheme in order to transmit data in particular to user terminals of private customers by means of the same twisted copper lines which are also used for ISDN services, for example. As a result, the installation costs for this new system are comparatively low for the network operator. It can therefore be used together with conventional telephone services, but, by contrast, it has the advantages of significantly higher transmission rates, namely about 6 to 8 megabits per second from the server to the user terminal and up to 640 kilobits per second from the user terminal to the server.

An essential property of the ADSL system in comparison with the ISDN system, for example, is that the modems at the user and operator ends have to be physically connected to one another (for example by means of a widely distributed copper line) and cannot simply be present respectively at one end of an interconnected and switched telephone connection. Consequently, one modem must usually be situated at a central distributor of the telephone company operating the ADSL system, and the other modem is correspondingly situated in the user's building. The modem which is connected in the switching station (central distributor) of the telephone company is called ATU-C (ADSL Terminal Unit Central). The modem which is situated at the user's end is called ATU-R (ADSL Terminal Unit Remote).

A further property of the ADSL system is that the bandwidth can be set by the operator. At present, in ADSL systems the bandwidth is set at the operator end in a manner governed by the system, i.e. the bandwidth is determined in accordance with the capabilities of the subscriber line used for transmission. In this method, which is also called rate-adaptive ADSL, the maximum possible bandwidth is set independently by the system. Thus, bandwidth is always used, which is generally prescribed by the line conditions.

EP 0 806 852 A2 discloses a multimode digital modem for ADSL transmissions. In an initialization method, the two modems involved at both ends of a line carry out a "negotiation method" (Rate Negotiation Method). Each of the modems involved communicates to the respective other modem its possibilities and desires with regard to the data transmission rate to be chosen for a transmission. The data transmission rate actually used during the transmission is then fixed according to an algorithm.

WO96/37069 discloses a video conference and multimedia system. A digital data transmission can be effected with different bandwidths, the currently used bandwidth being displayed.

SUMMARY OF THE INVENTION

The object of the present invention is to provide flexible, service-dependent control of the bandwidth in an ADSL system in the case of which the maximum bandwidth governed by the system represents merely the upper limit of the bandwidths that can be chosen.

By virtue of the invention's service-dependent control of the bandwidth in an ADSL system, the operator of the ADSL system is thus afforded various possibilities for service differentiation, resulting in greater possible exploitation of the market and therefore increased profitability for the operator.

Thus, the invention provides a method for digital data transmission with a variable bandwidth in a network, the network having at least one server, at least one user terminal and a network management system. In this case, firstly a connection is established between the user terminal and the server at least partly by means of an ADSL connection (i.e. between the ATU-R at the user's end and the ATU-C at the operator's end). Bandwidth selection data are then transmitted from the user terminal via the ADSL connection to the network management system assigned to the server. The actual transmission of information data from the server to the user terminal via the ADSL connection and/or vice versa can then be effected with a bandwidth corresponding to the previously transmitted bandwidth selection data, in which case, in accordance with a property of the ADSL system, the bandwidth of the transmission from the server to the user terminal is significantly greater the user terminal is significantly greater (factor of 10 to 100) than that from the user terminal to the server.

By way of example, the bandwidth selection data can be transmitted via the so-called EOC channel (embedded operations channel) of the ADSL connection.

The network management system may communicate billing data to a billing device (Billing System), assigned to the server, in a manner dependent on the bandwidth selection data that have previously been chosen by the user and transmitted to the network management system. In general, the charges calculated by the billing device will be higher, the greater the bandwidth chosen by the user.

Prior to the transmission of the bandwidth selection data to the user terminal, a number of predetermined bandwidths mask that can be selected by the user may be transmitted and displayed for example in the form of a mask on a display device of the user terminal. The maximum bandwidth of the predetermined bandwidths that can be selected may in this case be set automatically in a manner dependent on the system capabilities (in particular the line conditions of the subscriber line used for transmission).

Once the bandwidth selection data have been received, the network management system may transmit setting data to the ATU-C of the ADSL system, it being possible for the ATU-C to forward the setting data to the ATU-R of the ADSL system via the EOC channel of the ADSL system for the purpose of synchronizing the settings.

BRIEF DESCRIPTION OF THE DRAWINGS

Further features and properties of the present invention will become more apparent from the description of an exemplary embodiment with reference to the accompanying figures of the drawings, in which:

FIG. 2 shows the structure of an ADSL (Asymmetric Digital Subscriber Line) system, and FIG. 3 shows a graphical illustration of the service adaption as a function of the willingness to pay, in accordance with an empirical determination.

DESCRIPTION OF THE PREFERRED EMBODIMENTS

Figure 1:
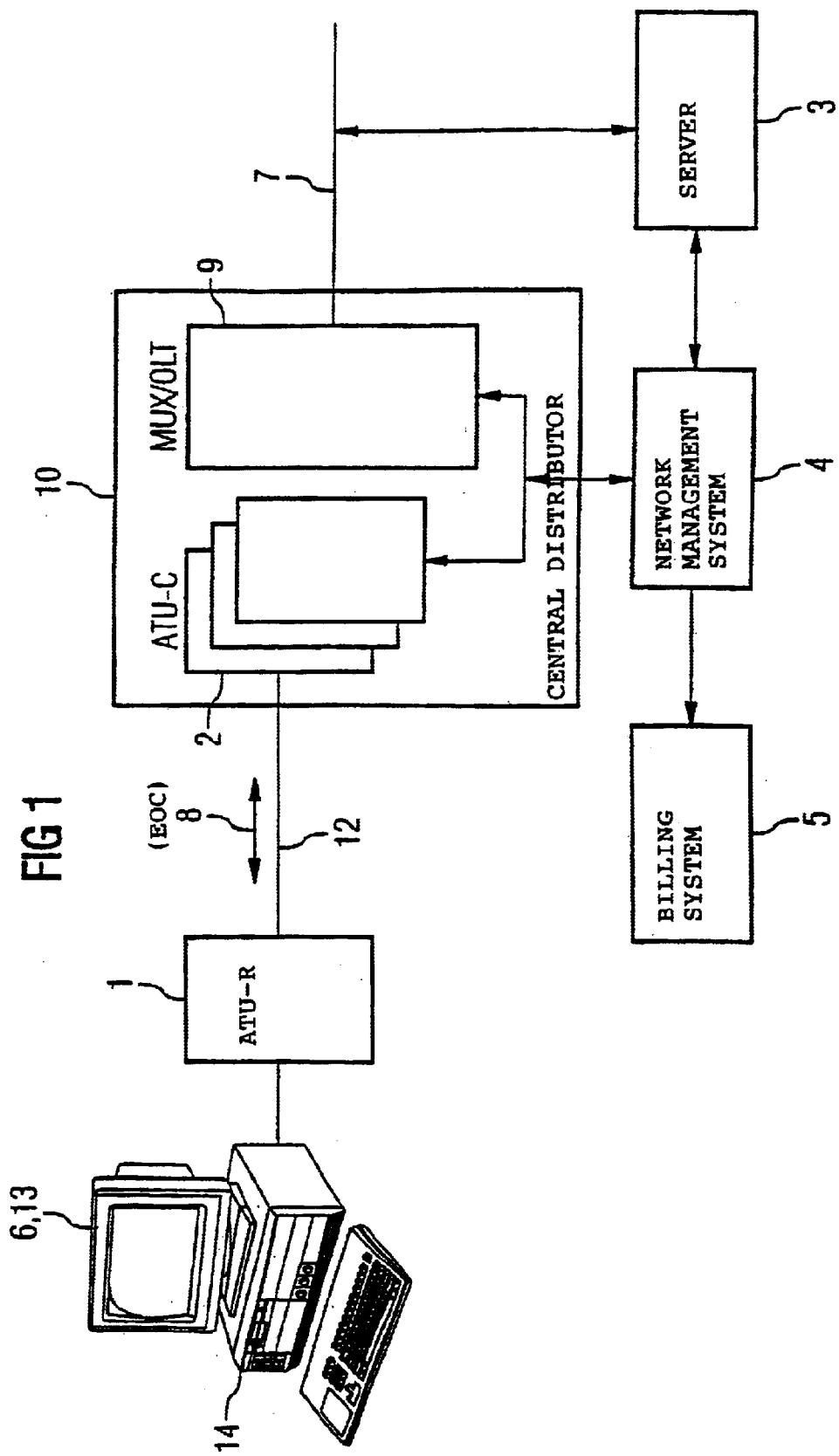
FIG. 1 shows a block diagram which elucidates the performance of the method according to the invention.

Firstly, the basic components of an ADSL system will be explained with reference to FIG. 2. In FIG. 2, the reference symbol 10 designates a central distributor of an operator company, which may contain a plurality of ATU-C 2 of an ADSL system. Data are transmitted to this central distributor 10 in a known manner via a line 7, for example by means of the Internet Protocol or HTTP protocol. Each ATU-C 2 of the ADSL system is physically connected by means of a conventional copper line 12 directly (without changeovers) to an ATU-R 1 situated in a user's building, for example. Since the ADSL requires a direct physical connection between the modem (ATU-C 2) at the operator end and the modem (ATU-R 1) at the user end, it is necessary to provide one ATU-C 2 per user terminal in the central distributor 10.

Since the ADSL system can use conventional telephone lines 12 (copper lines), the modem 1 can simultaneously supply a conventional telephone connection (POTS) 11. The actual information of the ADSL system, on the other hand, can be transmitted for example to an MPEG decoder 6, which, in turn, is connected to a user terminal 13 having a screen 14.

By way of example, it is possible to use 10 different (discrete) classes for ADSL transmission speeds (bandwidths), as illustrated in the table below.

| Class | Downstream (from the server to the user) | Upstream (from the user to the server) |
|---|---|---|
| 1 | 6.144 Mbps | 64 kbps |
| 2 | 4.608 Mbps | 64 kbps |
| 3 | 3.072 Mbps | 64 kbps |
| 4 | 1.536 Mbps | 64 kbps |
| 5 | 6.2 Mbps | 576 kbps |
| 6 | 3.1 Mbps | 384 kbps |
| 7 | 1.544 Mbps | 160 kbps |
| 8 | 768 kbps | 64 kbps |
| 9 | 384 kbps | 32 kbps |
| 10 | 160 kbps | 16 kbps |

(Veeneman, 838–840)

As an alternative, the bandwidth of the ADSL transmission can be transmitted in a continuously variable manner.

The invention makes use of this possibility of choosing the bandwidth in order to increase the profitability of the ADSL system for the operator.

This will now be explained in more detail with reference to FIG. 1. FIG. 1 shows a user terminal 13 with a screen 14 and an MPEG decoder 6, which is connected to an ATU-R (ADSL Terminal Unit Remote) 1. As already known from FIG. 2, the ATU-R 1 is physically connected by means of an ADSL line 12 to the central distributor 10 of the operator. An ATU-C (ADSL Terminal Unit Central) 2 connected directly to the ATU-R 1 and a multiplexer 9 are provided in the central distributor 10. At one end, the multiplexer 9 is fed data 7 in accordance with the Internet Protocol (HTTP protocol) in the asynchronous transfer mode (ATM). These data may be provided for example by a WWW server 3 of the Internet. As can be seen in FIG. 1, the central distributor 10 is furthermore connected to a network management system 4, with which it exchanges management data which are necessary for operating the network.

The network management system (Telecommunications Management Network, TMN) 4 is a dedicated network which assists the operator (Service Provider) in operating the telecommunications network. In other words, a TMN is a network of systems which is used for the management of telecommunications networks for the control of users. A TMN is logically separate from the network to be managed, and may also be physically separate from said network. On the other hand, a TMN may also use part of the telecommunications network for its own communication.

According to the invention, the bandwidth control is effected by means of the EOC (embedded operations channel) 8 present in the ADSL system. The EOC 8 is a channel which is provided for the management of the ADSL system and is thus logically assigned to the network management system 4. The EOC 8 enables the operator of the ADSL system to set the bandwidths (see the above table for example)—stipulated in the service which is offered—for the so-called downstream channel (from the server to the user terminal) and also for the upstream channel (from the user terminal to the server) by means of the network management system 4. According to the invention, the bandwidth settings are offered in particular via Internet or World Wide Web interfaces from the operator to the user and are then performed by the user of the system itself.

To that end, the network management system 4 is equipped with the corresponding interfaces to the World Wide Web and to the billing system 5 of the operator in order to acquire charges in accordance with the bandwidth chosen by the user.

The sequence of the method according to the invention will now be described in detail. The user of an ADSL connection 12 establishes a connection to the WWW server 3 of the operator, for example via the IP (Internet Protocol) and the HTTP protocol. After appropriate identification and authentication, the user is then offered on the screen 14 of his terminal 13 a mask for setting the bandwidth parameters of his ADSL connection. This mask may offer e.g. the classes of the table shown above. In this case, the system can automatically ascertain the maximum bandwidth prescribed by the line properties and choose it as upper limit of the bandwidths that can be selected. The user can then choose an option, i.e. he can communicate bandwidth selection data from his terminal 13 via the ADSL connection 12 to the operator, which confirms the acceptance of the chosen selection. The selection of a bandwidth which lies above the technically maximum bandwidth, detected e.g. by the network management system 4, may be blocked in this case.

At the same time, the parameters of the option desired by the user and also the user data (identification, etc.) can be transmitted to the network management system 4. The network management system 4 can then communicate the required parameters for the desired option firstly to the ATU-C 2 in the central distributor 10 of the operator. The ATU-C 2 can then forward the corresponding information to the ATU-R 1 via the EOC 8 of the ADSL connection 12, thereby ensuring synchronized setting of the modems 1, of the ADSL connection 12 to the new parameters. In the EOC 8, the operating codes (Opcodes) 19, 1*a*, 1*c*, 1*f*, which are reserved for manufacturer-specific protocols (ANSI T 1.413), can be used for setting the parameters.

Changing the parameters for the bandwidth chosen may take effect either immediately or upon the next connection setup.

After the change in the parameters has been carried out by the network management system, the associated billing information can be passed on to the billing system 5 of the operator. The billing system 5 of the operator can then charge the user the connection time to the WWW server 3 depending on the bandwidth chosen.

According to the invention, then, the possibilities of ADSL systems are advantageously utilized for a wide range of services. This wide range of services allows the operator of the ADSL systems to serve specific customer segments with tailored services (see FIG. 3), and thereby exploit the typical willingness of the customer segments to pay for specific transmission rates. According to the prior art, the present ADSL systems are designed in such a way that the maximum speed prescribed by the line is always used, irrespective of whether or not the user requires the full bandwidth. As a result of this lack of differentiation of the provision of services, the operator is passing up a sales potential, since, on the one hand, some customers would pay more and other customers do not take up the service since the offered performance and price exceed the customer's requirements. The use of a differentiated provision of services can result in as much as a doubling of the attainable sales for the operator. For the manufacturer of the ADSL solution provided with flexible service-dependent bandwidth control, this means, for an insignificantly higher outlay, a significantly higher attainable market price, since this solution leads to significantly higher sales for the operator.

What is claimed is:

1. A method for digital data transmission with a variable bandwidth in a network which has at least one server (3), a user terminal (6) and a network management system (4), having the following steps:

establishing a connection between the user terminal (6) and the server (3) at least partly by means of an ADSL connection (12), displaying a plurality of bandwidths that can be selected on a display device (14) of the user terminal (6), transmitting bandwidth selection data, based on the selected one of the plurality of bandwidths, from the user terminal (6) to the network management system (4) assigned to the server (3), transmitting information data from the server (3) to the user terminal (6) via the ADSL connection (12) and/or in the opposite direction with a bandwidth corresponding to the previously transmitted bandwidth selection data, in which case the network management system (4) communicates billing data to a billing device (5), assigned to the server (3), in a manner dependent on the previously transmitted bandwidth selection data, and once the bandwidth selection data have been received, the network management system (4) transmits setting data on an ATU-C (2) of an ADSL system, which forwards the setting data to an ATU-R (1) of the ADSL system via an embedded operations channel (8) of the ADSL system for the purpose of synchronizing the settings.

2. The method as claimed in claim 1, characterized in that the bandwidth selection data are transmitted via an embedded operations channel (8) of the ADSL connection (12).

3. The method as claimed in claim 1, characterized in that a maximum bandwidth of the plurality of predetermined bandwidths that can be selected is set in a manner dependent on the system capabilities.

\* \* \* \* \*